United States Patent
Matsumura et al.

(10) Patent No.: US 8,813,787 B2
(45) Date of Patent: Aug. 26, 2014

(54) SINGLE ACTING DIRECTIONAL CONTROL VALVE

(75) Inventors: Kenichi Matsumura, Tsukubamirai (JP); Masanori Kaitsuka, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 13/590,308

(22) Filed: Aug. 21, 2012

(65) Prior Publication Data
US 2013/0056669 A1 Mar. 7, 2013

(30) Foreign Application Priority Data
Sep. 1, 2011 (JP) .................................. 2011-190516

(51) Int. Cl.
*F16K 11/044* (2006.01)
*F16K 11/07* (2006.01)

(52) U.S. Cl.
USPC ............. 137/625.69; 137/625.27; 137/625.66

(58) Field of Classification Search
USPC ........................... 137/625.27, 625.66, 625.69
See application file for complete search history.

(56) References Cited

U.S. PATENT DOCUMENTS

| | | | | | |
|---|---|---|---|---|---|
| 119,364 | A | * | 9/1871 | Jonson | 137/625.63 |
| 1,679,614 | A | * | 8/1928 | Lichtenberg | 137/256 |
| 2,055,497 | A | * | 9/1936 | Hultquist | 137/625.66 |
| 2,886,377 | A | * | 5/1959 | Martin | 303/68 |
| 3,131,722 | A | * | 5/1964 | Abbott et al. | 137/625.6 |
| 3,902,526 | A | * | 9/1975 | Brake et al. | 137/625.64 |
| 6,488,050 | B1 | * | 12/2002 | Jabcon | 137/625.65 |
| 8,061,385 | B2 | | 11/2011 | Kaitsuka | |
| 2008/0087331 | A1 | * | 4/2008 | Kaitsuka | 137/512 |

FOREIGN PATENT DOCUMENTS

JP 2008-95818 4/2008

* cited by examiner

*Primary Examiner* — John Rivell
*Assistant Examiner* — Daphne M Barry
(74) *Attorney, Agent, or Firm* — Oblon, Spivak, McClelland, Maier & Neustadt, L.L.P.

(57) ABSTRACT

A valve rod is accommodated in a valve chest which is in communication with a plurality of ports, the valve rod has a round poppet valve disposed between a supply valve seat and a discharge valve seat, an annular protruding wall is formed on a side surface of the poppet valve, the protruding wall has a circumference surface including a cylindrical surface extending in parallel with an axial line of the valve chest and an inclined surface which enables the base end of the cylindrical surface to be smoothly continuous with the side surface of the poppet valve, and the cylindrical surface has a diameter smaller than that of the poppet valve and larger than that of a narrow portion of the valve rod.

8 Claims, 3 Drawing Sheets

SINGLE ACTING DIRECTIONAL CONTROL VALVE

BACKGROUND OF THE INVENTION

1. Field of the Invention

The present invention relates to a single-acting directional control valve which is driven by a pilot fluid pressure or the like and returned by biasing force of a return spring.

2. Description of the Related Art

A single-acting directional control valve illustrated in FIG. 4 is typically known as a component of a combination valve such as disclosed in Japanese Unexamined Patent Application Publication No. 2008-95818.

The directional control valve has a valve body 10 and a valve chest 11 formed thereinside, and the valve chest 11 formed inside the valve body 10 has openings at its two ends which are airtightly sealed by a lid 12 and a cover 13, respectively. A valve rod 30 is provided inside the valve chest 11 and driven in the direction of an axial line L, and the valve chest 11 is in communication with a supply port 19, an output port 20, and a discharge port 21 which open in the direction orthogonal to the direction of the axial line L and are aligned in sequence from one end of the valve chest 11 to the other end. Partitions 15 and 16 are provided between the supply port 19 and the output port 20 and between the output port 20 and the discharge port 21 to define the valve chest 11, respectively, and retainers 27 and 28 having a plurality of through-holes are provided between the partition 15 and the lid 12 and between the partition 16 and the cover 13 to guide the movement of the valve rod 30 in the direction of the axial line L, respectively.

The valve rod 30 which is supported by the retainers 27 and 28 so as to be able to slide inside the valve chest 11 in the direction of the axial line L has a guided portions 31 and 32 provided at its two ends in the direction of the axial line L so as to be guided by the inner surfaces of the retainers 27 and 28, respectively, and a disk-shaped poppet valve 37 provided between the guided portions 31 and 32 with narrow portions 35 and 36 interposed therebetween, respectively. The poppet valve 37 has a left side surface 37a and a right side surface 37b provided with valve seats 38a and 38b, respectively, and has a poppet-type structure, and the valve seats 38a and 38b are configured so as to face a supply valve seat 39a and a discharge valve seat 39b which are formed on the opposite end faces of the retainers 27 and 28, respectively.

The directional control valve is a single-acting type driven by a pilot fluid pressure. The lid 12, the retainer 27, and the end face of the guided portion 31 provided at an end of the valve 30 define space as a pilot pressure chamber 40, and the pilot pressure chamber 40 is in communication with a pilot fluid pressure source through a pilot valve (not illustrated); on the other hand, a return spring 41 is provided between the guided portion 32 provided at the other end of the valve rod 30 and the cover 13 to generate a biasing force to return the valve rod 30 to a return position in the case where a fluid pressure in the pilot pressure chamber 40 has been discharged.

In the single-acting directional control valve having the above-mentioned configuration, pilot air is supplied to the pilot pressure chamber 40, and then the valve rod 30 is driven by a pilot air pressure which acts on the end face of the guided portion 31 provided at an end of the valve rod 30 and then moves to the right side in FIG. 4. Then, the valve seat 38a of the poppet valve 37 separates from the supply valve seat 39a to largely open the channel therebetween, and the valve seat 38b is pressed against the discharge valve seat 39b to close the channel between the valve seat 38b and the discharge valve seat 39b, so that compressed air from the supply port 19 is output from the output port 20 to predetermined equipment.

In the case where the pilot air in the pilot pressure chamber 40 has been discharged, the biasing force of the return spring 41 moves the valve rod 30 from the switching position described above to the left side in the drawing. The valve seat 38a of the poppet valve 37 is pressed against the supply valve seat 39a to close the channel between the valve seat 38a and the supply valve seat 39a, and the valve seat 38b separates from the discharge valve seat 39b to open the channel therebetween, so that compressed air from the output port 20 is discharged from the discharge port 21 to the exterior.

In such a single-acting directional control valve, at an early stage at which the pilot air in the pilot pressure chamber 40 is discharged and the biasing force of the return spring 41 causes the valve seat 38b of the poppet valve 37 to separate from the discharge valve seat 39b, compressed air at high pressure flows from the output port 20 toward a space around the narrow portion 36 through the gap between the discharge valve seat 39b and the valve seat 38b as indicated by an arrow A. In the case where the compressed air rapidly flows toward the center of the valve rod through the gap as described above, a rapid air stream causes air around the side surface 37b of the poppet valve 37 to flow out with the result that a low-pressure area is generated in the vicinity of the side surface 37b, the side surface 37b being at the side of the discharge port 21. In the case where a decrease in the pressure is large, the poppet valve 37 is pushed back against the biasing force of the return spring 41 in some cases with the result that a switching operation of the valve rod 30 by the biasing force of the return spring 41 becomes unstable.

Such an unstable switching operation can be overcome by, for instance, an enhancement of the biasing force of the return spring 41; however, this needs approaches to be attempted, such as an enhancement of a fluid pressure of the pilot air to be supplied to the pilot pressure chamber 40 and an increase in a pressure-receiving area of the valve rod 30 in the pilot pressure chamber 40. Since such approaches have a large effect on the configuration or design of the directional control valve, it is desirable to develop a technique which can easily prevent the generation of a low-pressure area in the vicinity of the side surface 37b of the poppet valve 37, the side surface 37b being at the side of the discharge port 21.

BRIEF SUMMARY OF THE INVENTION

It is a technical object of the present invention to provide a mechanism which easily enables a valve rod to be stably returned by a return spring in a single-acting directional control valve.

In particular, it is a specific technical object of the present invention to provide a single-acting directional control valve having a simple mechanism which prevents a low-pressure area from being generated by a rapid air stream in the vicinity of the discharge-port-side surface of a poppet valve.

In order to accomplish the above-mentioned objects, the present invention provides a single-acting directional control valve including a valve body having a supply port, an output port, and a discharge port; a valve chest formed inside the valve body so as to be in communication with the ports; a valve rod accommodated in the valve chest so as to be able to slide in the direction of an axial line L of the valve chest; a switching driver which drives the valve rod; and a return spring, wherein the valve chest has a supply valve seat surrounding a channel between the supply port and the output port and a discharge valve seat surrounding a channel between the output port and the discharge port, the supply valve seat and the discharge valve set being formed so as to face each other in the direction of the axial line L; the valve rod has a round poppet valve provided between the supply valve seat and the discharge valve seat and narrow portions continuous with right and left side surfaces of the poppet valve, respectively; the right and left side surfaces of the poppet valve are orthogonal to the axial line L, annular valve seats are formed on the right and left side surfaces and contact and separate from the discharge valve seat and the supply valve seat, respectively, and the poppet valve is integrated with an annular protruding wall formed on at least the discharge valve seat-facing side surface selected from the right and left side surfaces so as to protrude in the direction of the axial line L; and the protruding wall has a circumference surface including a cylindrical surface extending in parallel with the axial line L and an inclined surface which enables the base end of the cylindrical surface to be smoothly continuous with the side surface of the poppet valve, and the cylindrical surface has a diameter smaller than that of the poppet valve and larger than those of the narrow portions of the valve rod.

In the present invention, preferably, the protruding wall has a height which enables the protruding wall to be completely exterior to an inner hole of one valve seat positioned at the side of the protruding wall in the case where the poppet valve has separated from such one valve seat and abuts on the other valve seat, and the height of the protruding wall is larger than a width of an annular space in the case where the protruding wall engages with the interior of an inner hole of such one valve seat, the annular space being formed between the cylindrical surface of the protruding wall and the inner surface of the inner hole.

The inclined surface is continuous with the side surface of the poppet valve at a portion interior to the valve seat.

In the present invention, a pair of cylindrical retainers may be provided inside the valve body in parallel with the axial line L, the retainers having through-holes formed in their side surfaces, and the through-holes functioning as part of the channels; the supply valve seat and the discharge valve seat may be formed on the facing ends of the retainers, respectively; the valve rod may be accommodated in the retainers; and the poppet valve may be disposed between the facing ends of the pair of retainers, respectively.

In the above-mentioned single-acting valve of the present invention, in the case where compressed air at high pressure rapidly flows from the output port toward the center of the valve chest through the gap between the discharge valve seat and the valve seat of the poppet valve at a stage at which the valve seat starts to separate from the discharge valve seat by the biasing force of the return spring, a direction of the air stream is changed to the direction of the axial line L by the protruding wall formed on the side surface of the poppet valve, and the air stream flows so as to separate from the poppet valve, so that a low-pressure area is not generated in the vicinity of the discharge-port-side surface of the poppet valve unlike the traditional single-acting directional control valves, which can solve the problem of an unstable switching operation of the valve rod.

As described above, in the present invention, a simple structure of the annular protruding wall formed in the vicinity of the discharge-port-side surface of the poppet valve can solve the problem in which the return spring unstably returns the valve rod in the single-acting directional control valve in some cases, which can eliminate disadvantageous approaches such as an enhancement of the biasing force of the return spring.

DETAILED DESCRIPTION OF THE INVENTION

Figure 1:
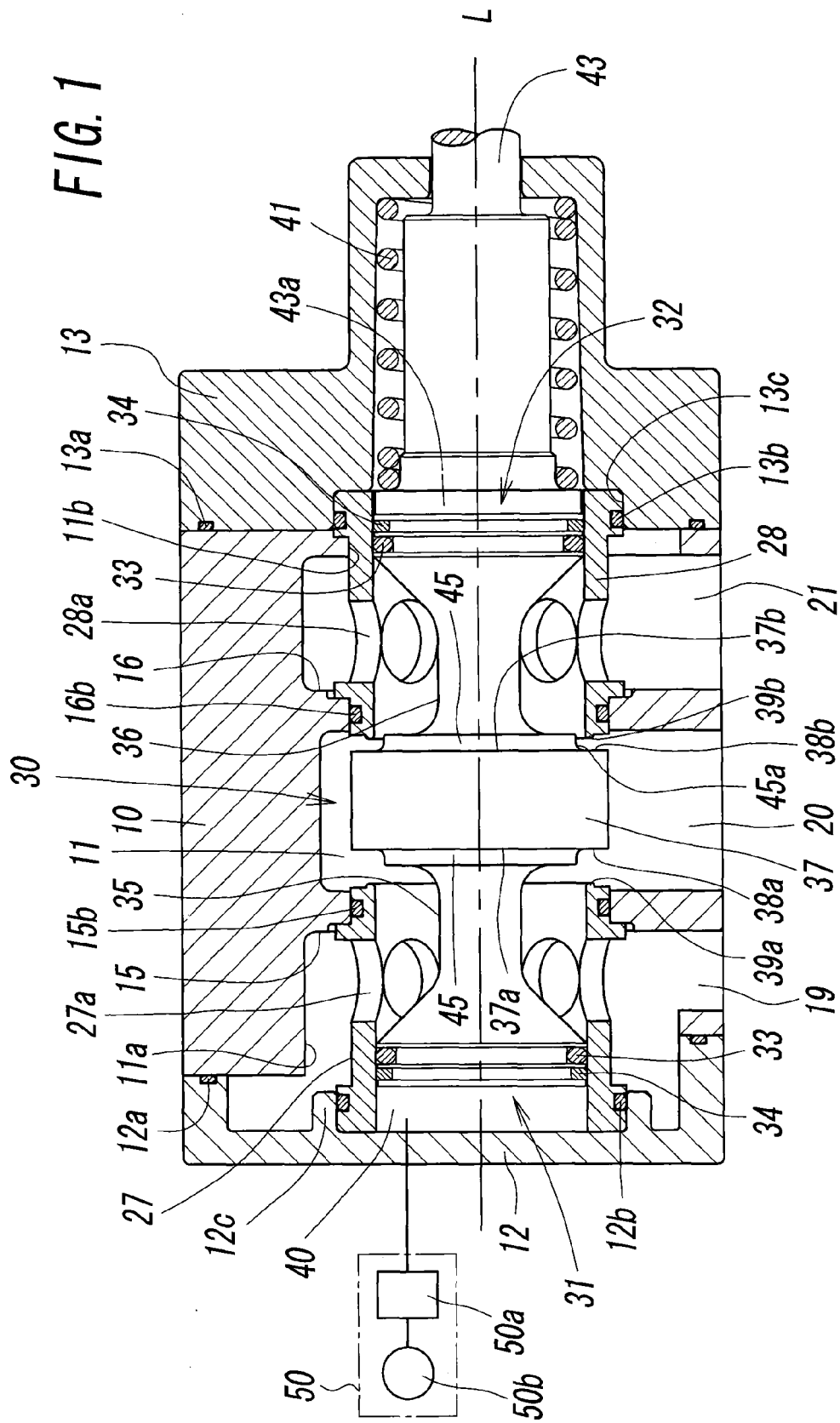
FIG. 1 is a cross-sectional view illustrating a single-acting directional control valve according to an embodiment of the present invention.
Figure 4:
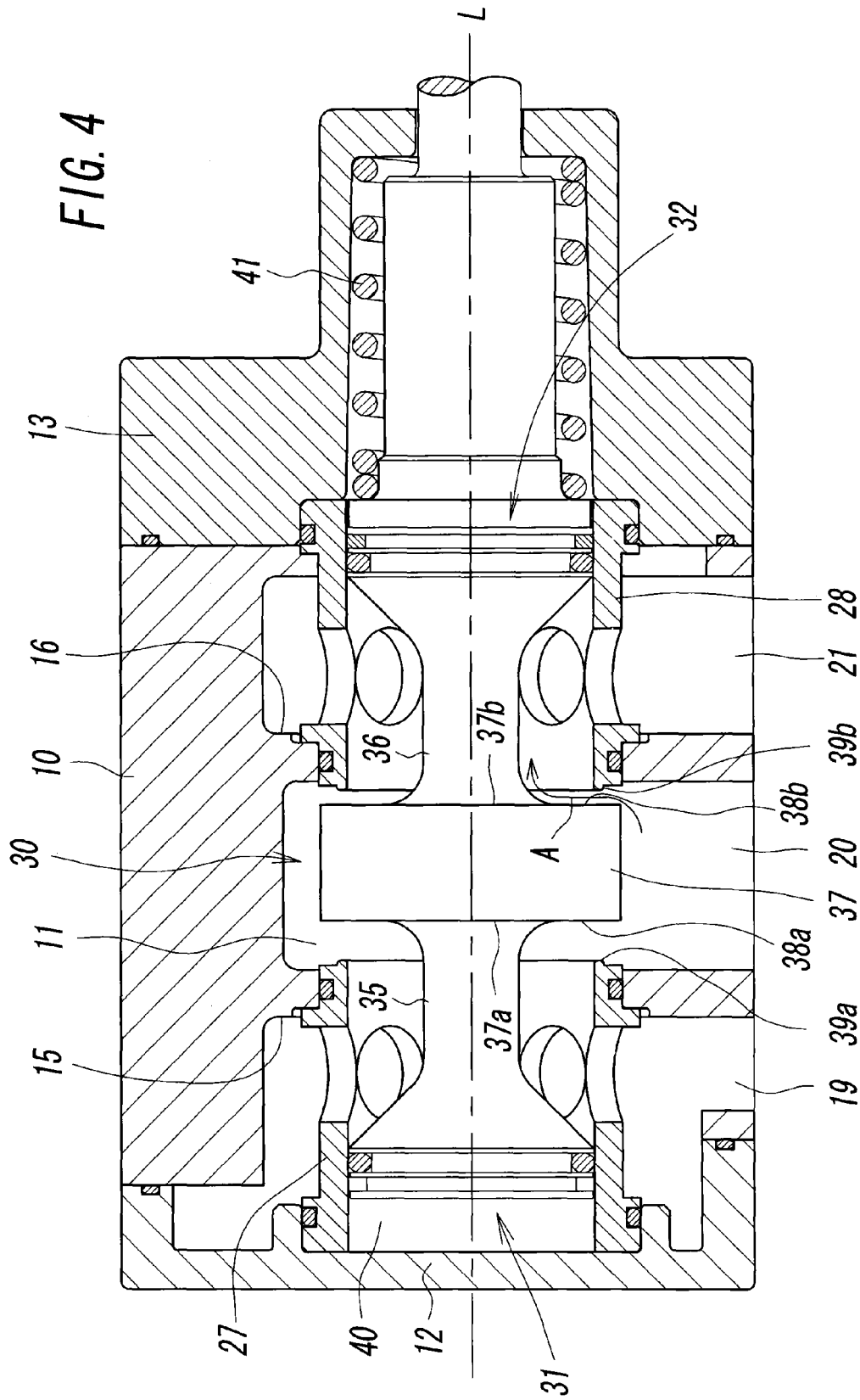
FIG. 4 is a cross-sectional view illustrating a traditional single-acting directional control valve.

FIG. 1 illustrates a single-acting directional control valve as an embodiment of the present invention in the form of a pilot-controlled directional control valve. The single-acting directional control valve as a pilot-controlled directional control valve is different from the traditional single-acting directional control valve illustrated in FIG. 4 in configurations associated with the poppet valve 37 of the valve rod 30, and the other configurations are substantially the same as those of the single-acting directional control valve illustrated in FIG. 4. In FIG. 1, components the same as or equivalent to the components of the directional control valve illustrated in FIG. 4 are therefore denoted by the same symbols, and the configuration of the single-acting directional control valve of the present invention will be newly described in detail.

The single-acting directional control valve illustrated in FIG. 1 has a valve body 10 and a valve chest 11 formed thereinside in the shape of a circular hole. An opening 11a at an end of the valve chest 11 in the direction of an axial line L is closed by a lid 12 airtightly fixed to an end of the valve body 10 with an O-ring 12a interposed therebetween, and an opening 11b at the other end of the valve chest 11 in the direction of the axial line L is closed by a cover 13 airtightly fixed to the other end of the valve body 10 with an O-ring 13a interposed therebetween.

A valve rod 30 is slidably inserted into the valve chest 11 in the direction of the axial line L. The valve chest 11 is in communication with a supply port 19, an output port 20, and a discharge port 21 which are each formed in a side surface of the valve body 10 in a direction orthogonal to the axial line L, and annular partitions 15 and 16 are formed on the inner surface of the valve chest 11 between a region continuous with the supply port 19 and a region continuous with the output port 20 and between a region continuous with the output port 20 and a region continuous with the discharge port 21, respectively, the annular partitions 15 and 16 protruding toward the center of the valve chest 11. The supply port 19, the output port 20, and the discharge port 21 are aligned in sequence from the opening 11a at an end of the valve chest 11 to the opening 11b at the other end.

In order to hold the slidable valve rod 30, a pair of cylindrical retainers 27 and 28 are attached to the interior of the valve chest 11. The retainers 27 and 28 are formed from metal, such as aluminum alloy, and are disposed so as to face each other at a certain interval while their central axes are aligned with the axial line L of the valve chest 11. The peripheral surfaces of the two ends of the first retainer 27 are airtightly held by a cylindrical retainer holder 12c on the inner surface of the lid 12 with an O-ring 12b interposed therebetween and by the partition 15 with an O-ring 15b interposed therebetween, respectively; on the other hand, the peripheral surfaces of the two ends of the second retainer 28 are airtightly held by a retainer-holding hole 13c formed in the end face of the cover 13 with an O-ring 13b interposed therebetween and by the partition 16 with an O-ring 16b interposed therebetween, respectively.

The inner space of the retainers 27 and 28 is in communication with the output port 20 through their openings at their respective ends facing each other. The inner space of the first retainer 27 is in communication with the supply port 19 via thorough-holes 27a of the first retainer 27, while the inner space of the second retainer 28 is in communication with the discharge port 21 via through-holes 28a of the second retainer 28. Thus, the inner space of the first retainer 27 functions as part of a channel between the supply port 19 and the output port 20, and the inner space of the second retainer 28 functions as part of a channel between the output port 20 and the discharge port 21. It can therefore be said that the inner space of the retainers 27 and 28 functions as part of the valve chest 11.

Annular supply valve seat 39a and discharge valve seat 39b are formed so as to be integrated with the opposite ends of the first and second retainers 27 and 28 and protrude in parallel with the axial line L to surround the above-mentioned channels formed by their inner space, respectively.

The valve rod 30 is formed from metal, such as aluminum alloy, and has guided portions 31 and 32 which are formed at its two ends in the direction of the axial line L and slidably engages with the interior of the pair of retainers 27 and 28, respectively, a disk-shaped poppet valve 37 formed at the center of the valve rod 30 in the direction of the axial line L so as to be positioned between the opposite ends of the pair of retainers 27 and 28, the narrow portions 35 and 36 formed between the poppet valve 37 and the respective guided portions 31 and 32. The guided portions 31 and 32 each have a diameter smaller than that of the poppet valve 37, and the narrow portions 35 and 36 each have a diameter further smaller than those of the guided portions 31 and 32. The guided portions 31 and 32 are provided with sealing portions 33 and wear rings 34 which slidably contact the inner surfaces of the retainers 27 and 28, respectively.

The poppet valve 37 contacts and separates from the supply valve seat 39a and the discharge valve seat 39b to open and close a channel (supply channel) between the supply port 19 and the output port 20 and a channel (discharge channel) between the output port 20 and the discharge port 21, respectively. The right and left side surfaces of the poppet valve 37 in the direction of the axial line L, in other words, a side surface 37b facing the discharge valve seat 39b and a side surface 37a facing the supply valve seat 39a are orthogonal to the axial line L, and annular valve seats 38a and 38b are formed on the side surfaces 37a and 37b in the vicinity of their peripheries and contact and separate from the supply valve seat 39a and the discharge valve seat 39b, respectively. The valve seats 38a and 38b are composed of annular, thin, flat sealing members, such as synthetic rubber, bonded to the side surfaces 37a and 37b of the poppet valve 37 so as to surround protruding walls 45 which will be described later, respectively, and illustration of the sealing members is omitted.

The single-acting directional control valve operates is a single-acting type, in which the valve rod 30 moves to the right side in FIG. 1 by actuation of a switching driver 50 with the result that the supply port 19 is brought into communication with the output port 20, and the valve rod 30 returns to the left side in FIG. 1 by biasing force of the return spring 41 when the switching driver 50 is not actuated. The switching driver 50 of the embodiment in the drawing utilizes a pilot fluid pressure to drive the valve rod 30. The lid 12, the retainer 27, and the end face of the guided portion 31 provided at one end of the valve rod 30 define space as a pilot pressure chamber 40, and the pilot pressure chamber 40 is in communication with a pilot fluid pressure source 50b though a pilot valve 50a; on the other hand, the return spring 41 is provided between the guided portion 32 provided at the other end of the valve rod 30 and the cover 13 to return the valve rod 30 to the return position when the fluid pressure in the pilot pressure chamber 40 has been discharged. The switching driver 50 is not limited to the driving mechanism utilizing pilot fluid pressure in FIG. 1, and mechanical driving mechanisms or other driving mechanisms may be employed.

Figure 2:
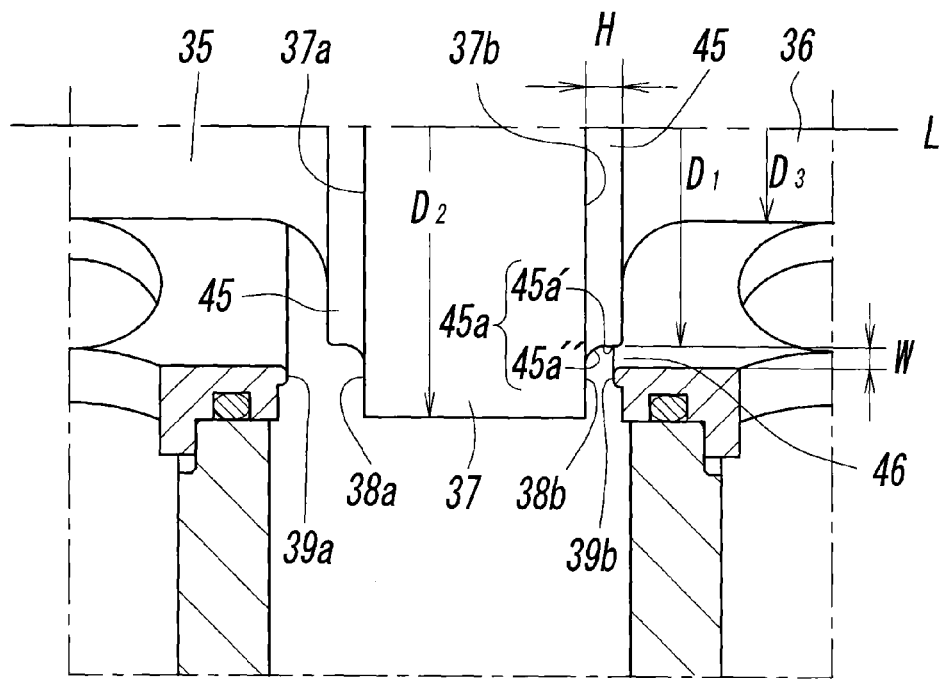
FIG. 2 is an enlarged view illustrating part of FIG. 1.

The annular protruding wall 45 is formed on at least the side surface 37b of the poppet valve 37 selected from the left side surface 37a and right side surface 37b thereof so as to protrude from the side surface 37b in the direction of the axial line L, the side surface 37b facing the discharge valve seat 39b. When the poppet valve 37 separates from the discharge valve seat 39b, the protruding wall 45 changes a direction of an air stream which flows from the vicinity of the discharge valve seat 39b toward the center of the valve chest 11 along the side surface 37b of the poppet valve 37 to the direction of the axial line L at an early stage, thereby promoting the separation from the side surface 37b of the poppet valve 37. With reference to FIG. 2, the protruding wall 45 has a circumference surface 45a including a cylindrical surface 45a' parallel to the axial line L and an inclined surface 45a" which enables the base end of the cylindrical surface 45a' to be smoothly continuous with the side surface 37b of the poppet valve 37, and the circumference surface 45a serves to change a direction of the air stream. The cylindrical surface 45a' has a diameter D1 smaller than a diameter D2 of the poppet valve 37 and larger than a diameter D3 of the narrow portion 36 of the valve rod 30. The inclined surface 45a" is continuous with the side surface 37b of the poppet valve 37 at a portion interior to the valve seat 38b. In the embodiment in the drawings, although the inclined surface 45a" is curved so as to form an arc (shape of horn), a linear shape (conical shape) may be formed.

The protruding wall 45 has a height H which enables the protruding wall 45 to be completely exterior to the inner hole (inner space) of the discharge valve seat 39b in the case where the poppet valve 37 separates from the discharge valve seat 39b and contacts the supply valve seat 39a. The height is preferably larger than a width W of an annular space 46 formed between the cylindrical surface 45a' of the protruding wall 45 and the inner surface of the inner hole of the discharge valve seat 39b in the case where the protruding wall 45 engages with the interior of the inner hole.

Unlike the traditional directional control valve described above, the annular protruding wall 45 prevents a low-pressure area from being generated in the vicinity of the side surface 37b, which being at the side of the discharge port 21, of the poppet valve 37 due to a rapid air stream along the side surface 37b, which eliminates a problematically unstable switching operation of the valve rod 30.

In particular, when the poppet valve 37 starts to separate from the discharge valve seat 39b by the biasing force of the return spring 41, compressed air at high pressure starts to rapidly flow from the output port 20 toward the center of the valve chest 11 through the gap between the discharge valve seat 39b and the valve seat 38b, and the circumference surface 45a of the protruding wall 45 on the side surface 37b of the poppet valve 37 changes a direction of the compressed air stream to the direction of the axial line L, so that the compressed air flows so as to separate from the side surface 37b of the poppet valve 37. Thus, a low-pressure area is not generated in the vicinity of the poppet valve 37 at the side of the discharge port 21 unlike the typical single-acting directional control valves, which eliminates an unstable switching operation of the valve rod 30.

In the embodiment in FIG. 1, the protruding wall 45 is integrally formed on the side surface of the poppet valve 37 by increasing a thickness of the poppet valve 37 at a portion interior to the valve seat 38b, and the side surface of the protruding wall 45 is integrally continuous with one end of the narrow portion 36 of the valve rod 30. The protruding wall 45 may, however, have a hollow structure, such as a modification illustrated in FIG. 3. In this case, an end of the narrow portion 36 of the valve rod 30 is continuous with the side surface 37b of the poppet valve 37 inside the protruding wall 45. Furthermore, in the case where the sealing member as a component of the valve seat 38b is bonded to the side surface 37b of the poppet valve 37, the protruding wall 45 can be integrated with the sealing member. In this case, an end of the narrow portion 36 of the valve rod 30 is continuous with the side surface 37b of the poppet valve 37.

Figure 3:
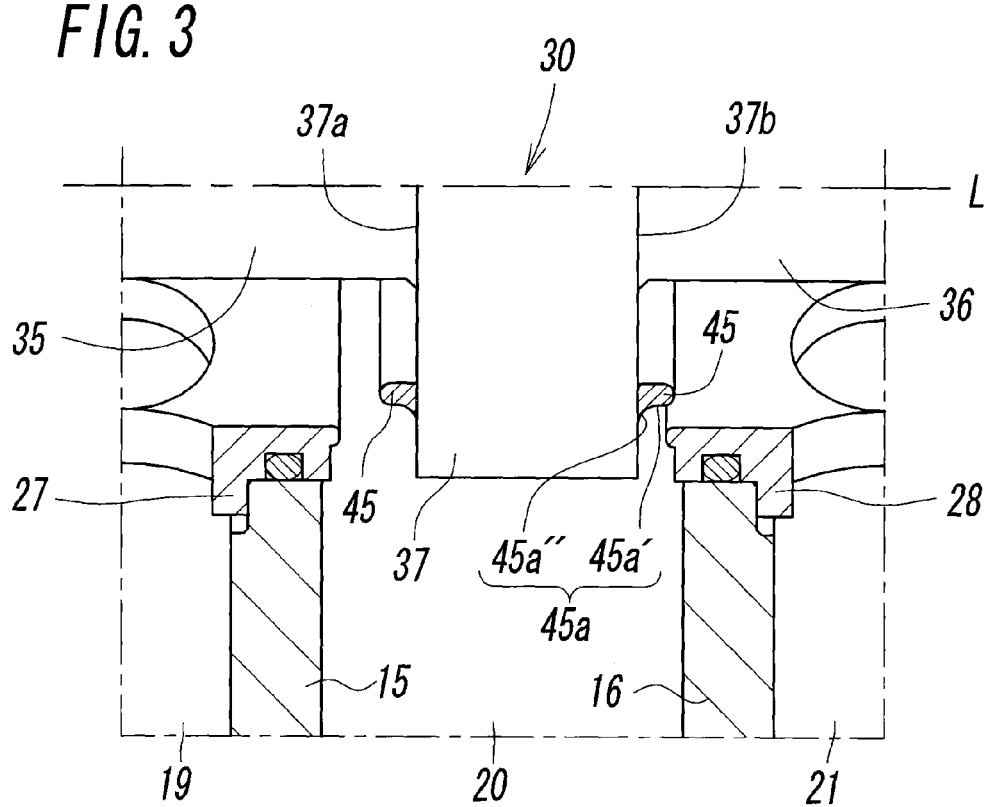
FIG. 3 is a half-sectional view partially illustrating an elongated protrusion having the annular protruding wall as a modification the annular protruding wall.

In the poppet valve 37 in FIGS. 1 and 3, the protruding walls 45 are symmetrically formed on both the discharge valve seat 39b-facing side surface 37b of the poppet valve 37 and the opposite side surface, namely, the supply valve seat 39a-facing side surface 37a, and this is because formation of the valve rod 30 having the poppet valve 37 with the symmetrical two side surfaces enables the poppet valve 37 to be accommodated in the valve chest 11 regardless of the orientation thereof, therefore, such a configuration is not essential in the embodiment in the drawings. In contrast, such a configuration is effective in the case where the supply port 19 is replaced with the discharge port 21, in other words, in the case where the discharge port 21 is used as a supply port, and the supply port 19 is used as a discharge port.

In FIG. 1, the guided portion 32 of the valve rod 30 is brought into contact with a flange 43a of a rod 43 with the result that the biasing force of the return spring 41 acts on the end face of the guided portion 32 of the valve rod 30 through the flange 43a, while the rod 43 is guided to the exterior by the cover 13 and connected to a position detector (not illustrated) which detects an operating position of the valve rod 30. In the case where the position detector does not need to be provided, the biasing force of the return spring 41 can directly act on the guided portion 32 of the valve rod 30.

In the single-acting directional control valve having the configuration described above, in the case where pilot air is supplied to the pilot pressure chamber 40, a pilot air pressure acts on the end face of the guided portion 31 provided at an end of the valve rod 30 to drive and move the valve rod 30 to the right side in FIG. 1, the valve seat 38a of the poppet valve 37 separates from the supply valve seat 39a to largely open a supply channel inside the inner hole of the supply valve seat 39a, and the valve seat 38b is pressed against the discharge valve seat 39b to close a discharge channel inside the inner hole of the discharge valve seat 39b. Thus, the supply port 19 is brought into communication with the output port 20, and compressed air from the supply port 19 is output from the output port 20 to predetermined equipment.

In the case where the pilot air in the pilot pressure chamber 40 has been discharged, the valve rod 30 at the right side moves to the left side by the biasing force of the return spring 41, the valve seat 38a of the poppet valve 37 is pressed against the supply valve seat 39a to close the supply channel, and the valve seat 38b separates from the discharge valve seat 39b to open the discharge channel. The compressed air from the output port 20 is therefore discharged from the discharge port 21 to the exterior. In this case, as described above, at the stage at which the valve seat 38b of the poppet valve 37 starts to separate from the discharge valve seat 39b by the biasing force of the return spring 41, even though compressed air at high pressure flows from the output port 20 to a space around the narrow portion 38 of the valve rod 30 through the gap between the discharge valve seat 39b and the valve seat 38b, the protruding wall 45 changes a direction of its air stream to the direction of the axial line L with the result that the air stream flows so as to separate from the poppet valve 37, which eliminates unstable switching operation of the valve rod 30.

In the embodiment illustrated in the drawings, the pair of retainers 27 and 28 are provided inside the valve body 10, and the valve rod 30 is slidably supported by the retainers 27 and 28; however, the supply valve seat 39a and the discharge valve seat 39b may be directly formed on the valve body 10 without use of the retainers 27 and 28, and the guided portions 31 and 32 of the valve rod 30 may be directly supported by the valve body 10.

Furthermore, the supply valve seat 39a and the discharge valve seat 39b may be formed from synthetic resin, synthetic rubber, or other materials, and the valve seats 38a and 38b may be directly formed on part of the side surfaces 37a and 37b of the poppet valve 37 formed from metal, respectively. In this case, the valve seats 38a and 38b are made from metal.

The invention claimed is:

1. A single-acting directional control valve comprising:
   a valve body having a supply port, an output port, and a discharge port;
   a valve chest formed inside the valve body so as to be in communication with the supply, output, and discharge ports;
   a valve rod accommodated in the valve chest so as to be able to slide in a direction of an axial line of the valve chest;
   a switching driver which drives the valve rod; and
   a return spring,
   wherein the valve chest includes
      a supply valve seat surrounding a channel between the supply port and the output port, and
      a discharge valve seat surrounding a channel between the output port and the discharge port, the supply valve seat and the discharge valve set being formed so as to face each other in the direction of the axial line,
   wherein the valve rod includes
      a round poppet valve provided between the supply valve seat and the discharge valve seat, and
      narrow portions continuous with right and left side surfaces of the poppet valve, respectively,
   wherein the right and left side surfaces of the poppet valve are orthogonal to the axial line, annular valve seats are formed on the right and left side surfaces of the poppet valve so as to contact and separate from the discharge valve seat and the supply valve seat, respectively, and the poppet valve is integrated with an annular protruding wall formed on at least a side surface of the poppet valve, the side surface being selected from the right and left side surfaces of the poppet valve so as to protrude in the direction of the axial line, and the side surface facing the discharge valve seat, and
   wherein the protruding wall has a circumference surface including
      a cylindrical surface having a uniform outer diameter and extending in parallel with the axial line, and
      an inclined surface which enables a base end of the cylindrical surface to be smoothly continuous with the side surface of the poppet valve, the inclined surface having a diameter that gradually increases toward the side surface of the poppet valve, and the cylindrical surface having a diameter smaller than a diameter of the poppet valve and larger than a diameter of the narrow portions of the valve rod.

2. The single-acting directional control valve according to claim 1, wherein the protruding wall has a height which enables the protruding wall to be completely exterior to an inner hole of a first valve seat of the annular valve seats positioned at a side of the protruding wall in a case where the poppet valve has separated from the first valve seat and abuts on a second valve seat of the annular valve seats, and the height of the protruding wall is larger than a width of an annular space in a case where the protruding wall engages with an interior of an inner hole of the first valve seat, the annular space being formed between the cylindrical surface of the protruding wall and an inner surface of the inner hole.

3. The single-acting directional control valve according to claim 1, wherein the inclined surface is continuous with a corresponding one of the side surfaces of the poppet valve at a portion interior to a corresponding one of the annular valve seats.

4. The single-acting directional control valve according to claim 2, wherein the inclined surface is continuous with a corresponding one of the side surfaces of the poppet valve at a portion interior to a corresponding one of the annular valve seats.

5. The single-acting directional control valve according to claim 1, wherein a pair of cylindrical retainers are provided inside the valve body in parallel with the axial line, the retainers having through-holes formed in side surfaces thereof, respectively, the through-holes functioning as part of the channels, respectively;

the discharge valve seat and the supply valve seat are formed on the facing ends of the retainers, respectively;

the valve rod is accommodated in the retainers; and the poppet valve is disposed between the facing ends of the pair of retainers, respectively.

6. The single-acting directional control valve according to claim 2, wherein a pair of cylindrical retainers are provided inside the valve body in parallel with the axial line, the retainers having through-holes formed in side surfaces thereof, respectively, the through-holes functioning as part of the channels, respectively; the discharge valve seat and the supply valve seat are formed on the facing ends of the retainers, respectively; the valve rod is accommodated in the retainers; and the poppet valve is disposed between the facing ends of the pair of retainers, respectively.

7. The single-acting directional control valve according to claim 3, wherein a pair of cylindrical retainers are provided inside the valve body in parallel with the axial line, the retainers having through-holes formed in side surfaces thereof, respectively, the through-holes functioning as part of the channels, respectively;

the discharge valve seat and the supply valve seat are formed on the facing ends of the retainers, respectively;

the valve rod is accommodated in the retainers; and the poppet valve is disposed between the facing ends of the pair of retainers, respectively.

8. The single-acting directional control valve according to claim 4, wherein a pair of cylindrical retainers are provided inside the valve body in parallel with the axial line, the retainers having through-holes formed in side surfaces thereof, respectively, the through-holes functioning as part of the channels, respectively;

the discharge valve seat and the supply valve seat are formed on the facing ends of the retainers, respectively;

the valve rod is accommodated in the retainers; and the poppet valve is disposed between the facing ends of the pair of retainers, respectively.

* * * * *